(12) United States Patent
Lee

(10) Patent No.: US 6,733,141 B2
(45) Date of Patent: May 11, 2004

(54) APPARATUS FOR FINE-ADJUSTING ORIENTATION OF OPTICAL DEVICE

(75) Inventor: Hee-joong Lee, Seoul (KR)

(73) Assignee: Samsung Electronics Co., LTD, Suwon (KR)

( * ) Notice: Subject to any disclaimer, the term of this patent is extended or adjusted under 35 U.S.C. 154(b) by 147 days.

(21) Appl. No.: 10/161,676

(22) Filed: Jun. 5, 2002

(65) Prior Publication Data

US 2003/0051357 A1 Mar. 20, 2003

(30) Foreign Application Priority Data

Sep. 4, 2001 (KR) ........................................ 2001-54153

(51) Int. Cl.⁷ ............................................. G03B 21/00
(52) U.S. Cl. .................. 353/122; 353/20; 353/119; 349/58
(58) Field of Search ................ 353/20, 100, 101, 353/119, 122; 349/18, 58; 359/500, 501, 813

(56) References Cited

U.S. PATENT DOCUMENTS

| | | | | |
|---|---|---|---|---|
| 5,988,818 | A | * 11/1999 | Fujimori et al. | ............. 353/119 |
| 6,322,217 | B1 | * 11/2001 | Fujimori et al. | ............... 353/31 |
| 6,460,998 | B1 | * 10/2002 | Watanabe | ..................... 353/20 |
| 6,547,402 | B2 | * 4/2003 | Masuda | ...................... 353/101 |

FOREIGN PATENT DOCUMENTS

JP      60-227211      11/1985

* cited by examiner

Primary Examiner—William C. Dowling
(74) Attorney, Agent, or Firm—Staas & Halsey LLP

(57) ABSTRACT

An apparatus for finely adjusting an orientation of an optical device. The apparatus includes a base plate which supports an optical device, a bracket coupled to the base plate such that the base plate is rotatable with respect to the bracket, a spring disposed between the base plate and the bracket to apply an elastic force to the base plate, and an adjusting element which pushes the base plate against the bracket through the base plate to adjust a relative position of the optical device with respect to the bracket. The apparatus can finely and precisely adjust the orientation of the optical device.

42 Claims, 5 Drawing Sheets

APPARATUS FOR FINE-ADJUSTING ORIENTATION OF OPTICAL DEVICE

CROSS-REFERENCE TO RELATED APPLICATIONS

This application claims the benefit of Korean Application No. 2001-54153, filed Sep. 4, 2001, in the Korean Industrial Property Office, the disclosure of which is incorporated herein by reference.

BACKGROUND OF THE INVENTION

1. Field of the Invention

The present invention relates to an apparatus for fine-adjusting an orientation of an optical device, and more particularly, to an apparatus capable of finely and easily adjusting an orientation of an optical device with respect to an imaging device.

2. Description of the Related Art

An apparatus including an optical device requires accurate orientation alignment of the optical device therein. When light emitted from a light source inaccurately radiates onto a position of the optical device, an optical efficiency of the optical advice is lowered, thereby degrading a performance of the apparatus including the optical device.

For example, in a three-panel projection system, an inaccurate orientation adjustment of $\lambda/4$-wave plates disposed in front of red, green, blue imaging apparatuses causes inappropriate polarization or produces light beams of undesired wavelengths, thereby degrading the quality of an image projected onto a screen and adversely affecting a contrast ratio (hereinafter, referred to as a "contrast").

FIG. 1 is a perspective view of a conventional fine-adjusting apparatus adjusting an orientation of a $\lambda/4$-wave plate 13 with respect to an imaging device 19. The fine-adjusting apparatus includes a $\lambda/4$-wave plate base 15 into which the $\lambda/4$-wave plate 13 is mounted, a base plate 17 positioned on imaging device 19, and a bracket 11 to which the $\lambda/4$-wave plate 13 is coupled.

In assembling the conventional fine-adjusting apparatus, the base plate 17 is mounted to the imaging device 19, and the $\lambda/4$-wave plate base 15 supporting the $\lambda/4$-wave plate 13 is placed on the base plate 17. After the $\lambda/4$-wave plate 13 is coupled to the bracket 11, the bracket 11 is fixed to the base plate 17 having screw apertures 10a, 10b, 10c, and 10d, and then to the imaging device 19 having screw apertures 20a, 20b, 20c, and 20d, by screws (not shown).

In the conventional fine-adjusting apparatus, the $\lambda/4$-wave plate base 15 is rotated along a circle formed in the bracket 11 by inserting a sharply tipped tool into indentations 3 and 5 formed on the $\lambda/4$-wave plate base 15 until the $\lambda/4$-wave plate 13 is in an optimal position. Then, the $\lambda/4$-wave plate 13 is fixed to a position of the bracket 11 to complete a fine adjustment. After the fine-adjustment is completed, the $\lambda/4$-wave plate base 15 and the base plate 17 are bonded to each other using a bonding agent.

The conventional fine-adjusting apparatus requires an extra device for the fine-adjustment. Manually rotating the $\lambda/4$-wave plate base 15 using the extra device in the conventional fine-adjusting apparatus described above may have a large variation and thus fails to accurately adjust the orientation of the $\lambda/4$-wave plate base 15 with respect to the image device 19.

The conventional fine-adjusting apparatus uses the bracket 11 to fix the $\lambda/4$-wave plate base 15 holding the $\lambda/4$-wave plate 13. The structure of the bracket 11 tightens the $\lambda/4$-wave plate 13 so that the stress is transferred to the $\lambda/4$-wave plate 13, thereby deteriorating the uniformity of the image projected onto the screen. In addition, the conventional fine-adjusting apparatus has a problem of difficulty in fixing the $\lambda/4$-wave plate 13 on the $\lambda/4$-wave plate base 15 after the $\lambda/4$-wave plate 13 is fine-adjusted with respect to the $\lambda/4$-wave plate base 15.

When the conventional fine-adjusting apparatus having the above described structure is applied to adjust an orientation of an optical device, such as a $\lambda/4$-wave plate, in a system, it is difficult to finely adjust the orientation and fix a position of the optical device to an image device, and thus an overall performance of the system degrades.

SUMMARY OF THE INVENTION

To solve the above and other problems, it is an object of the present invention to provide a precise orientation adjusting apparatus capable of easily and finely adjusting an orientation of an optical device and capable of easily fixing a position of the optical device.

Additional objects and advantages of the invention will be set forth in part in the description which follows and, in part, will be obvious from the description, or may be learned by practice of the invention.

To achieve the above and other objects, there is provided an apparatus for finely adjusting an orientation of an optical device. The apparatus includes a base plate which supports the optical device and is rotatable to the left and right, a bracket coupled to the base plate such that the base plate is rotatable with respect to the bracket, a spring disposed between the base plate and the bracket to apply an elastic force to the base plate, and an adjusting element pushing the base plate against the bracket to adjust a relative position of the optical device with respect to the bracket.

According to an aspect of the present invention, the base plate has coupling slots at upper and lower ends, and one of the coupling slots horizontally extends to allow the base plate to rotate with respect to the bracket. According to another aspect of the present invention, the bracket has coupling pins at upper and lower ends, and one of the coupling pins acts as a rotation axis of the base plate while the coupling pins engage the respective coupling slots. The base plate has on one side a screw aperture to be engaged with the adjusting element. The bracket includes a support projection supporting the spring. The adjusting element may be a screw.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
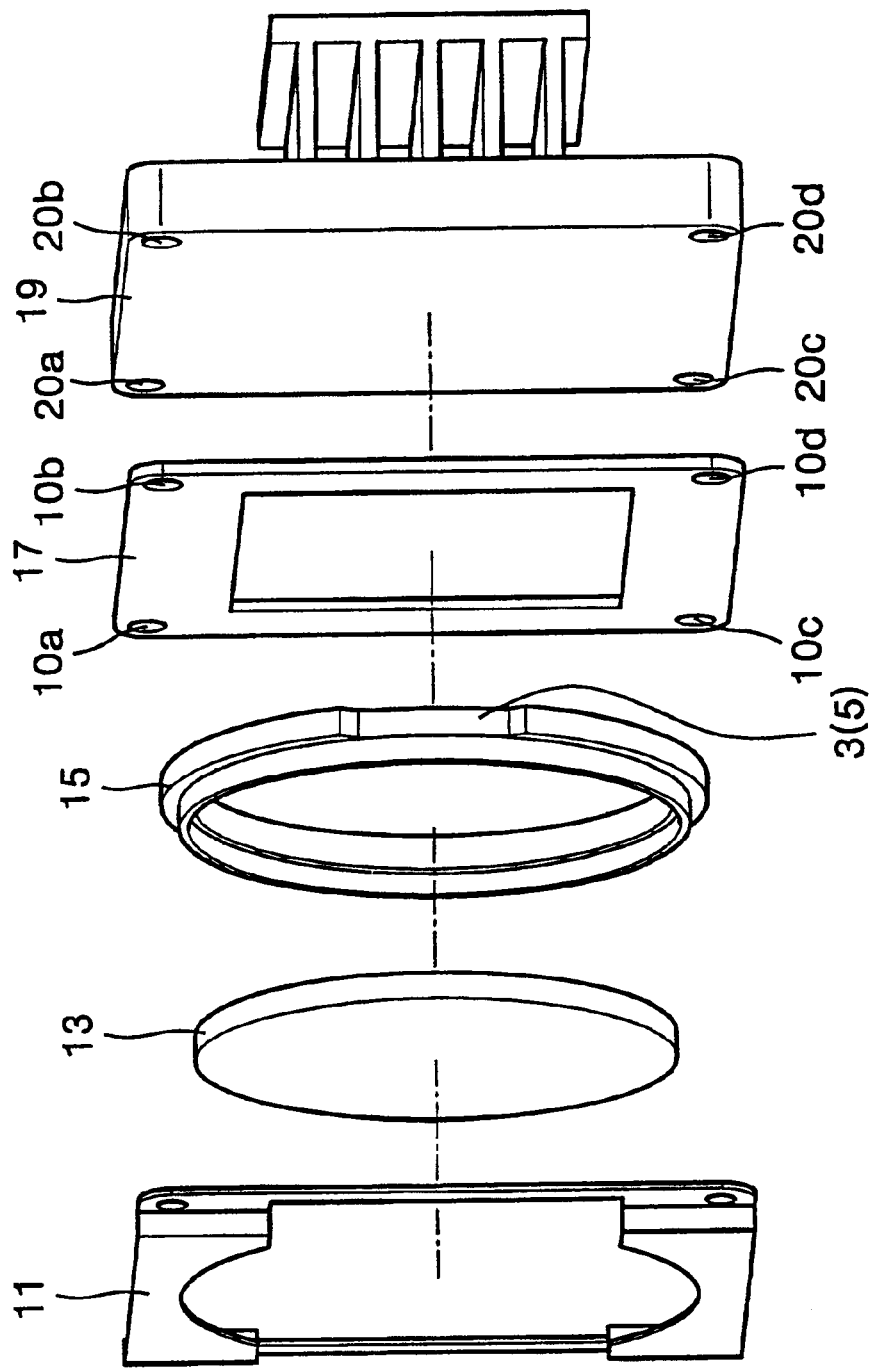
FIG. 1 is a perspective view of a conventional optical device fine-adjusting apparatus.

Reference will now be made in detail to the present preferred embodiments of the present invention, examples of which are illustrated in the accompanying drawings, wherein like reference numerals refer to the like elements throughout. The embodiments are described below in order to explain the present invention be referring to the figures.

The present invention provides an apparatus capable of finely and accurately adjusting an orientation of an optical device and capable of easily fixing a position of the optical device with respect to an imaging device. Here, the optical device includes one of λ/8, λ/4, and λ/2 wave plates and/or a retarder.

Figure 2:
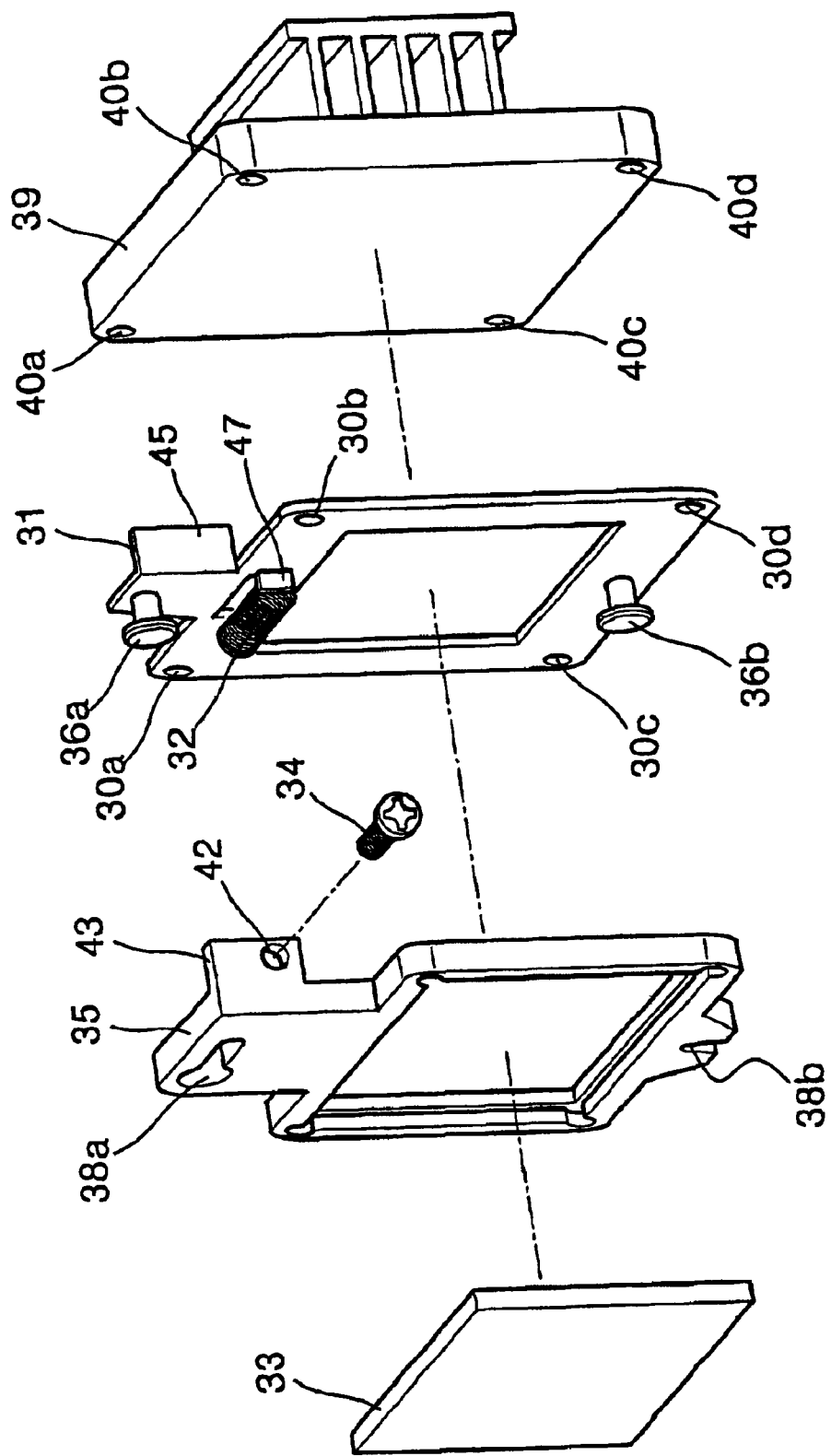
FIG. 2 is an exploded perspective view of an optical device fine-adjusting apparatus according to an embodiment of the present invention.
Figure 3:
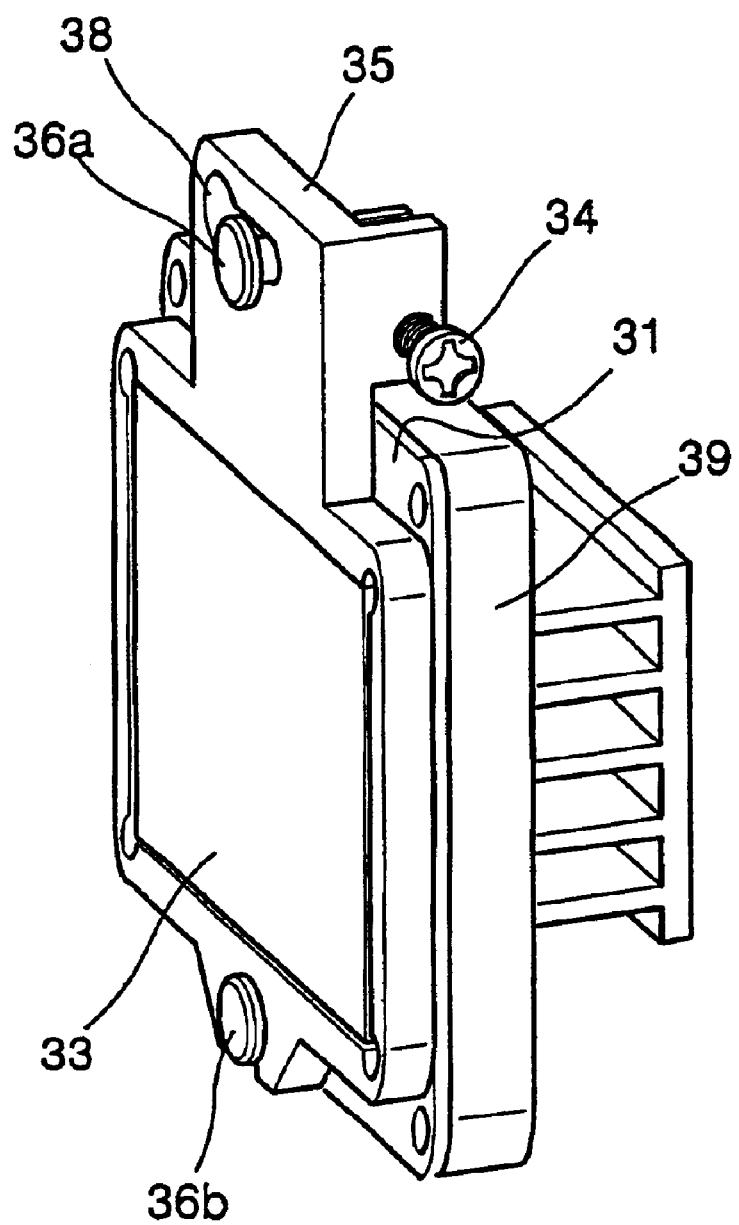
FIG. 3 is a perspective view of the optical device fine-adjusting apparatus of FIG. 2.

FIG. 2 is an exploded perspective view of an optical device fine-adjusting apparatus according to an embodiment of the present invention, and FIG. 3 is a perspective view of the optical device fine-adjusting apparatus of FIG. 2. Referring to FIGS. 2 and 3, the optical device fine-adjusting apparatus includes a base plate 35 on which an optical device 33 is mounted, a bracket 31 to which the base plate 35 is coupled such that the base plate 35 is rotatable to the left and right with respect to the bracket 31 or in clockwise and counterclockwise directions, a spring 32 disposed between the base plate 35 and the bracket 31 to apply an elastic force to the base plate 35, and an adjusting element pushing the base plate 35 against the bracket 31 to adjust a relative position of the optical device 33 with respect to the bracket 31. The adjusting element may be a screw 34.

The base plate 35 has a cavity at a center portion thereof to receive the optical device 33 therein. The base plate 35 has coupling slots 38a and 38b formed at upper and lower ends of the base plate 35 to be engaged with coupling pins 36a and 36b of the bracket 31, respectively. The coupling slot 38a disposed at the upper end of the base plate 35 is formed to extend in a horizontal direction such that the base plate 35 is rotatable with respect to the bracket 31. The coupling slot 38b disposed at the lower end of the base plate 35 is narrowed such that the base plate 35 can pivot about the coupling pin 36b coupled to the same.

A first bent portion 43 having a screw aperture 42 to be engaged with a screw 34 is formed on an upper side of the base plate 35 to protrude towards the bracket 31.

The bracket 31 has a cavity at a center to allow light passing through the optical device 33 to enter an imaging device 39. The optical device 33 communicates with the imaging device 39 through the cavity of the base plate 35 and an opening of the bracket 31. The coupling pins 36a and 36b to engage the coupling slots 38a and 38b of the base plate 35 are formed at upper and lower ends of the bracket 31.

A second bent portion 45 is formed on an upper side of the bracket 31 to protrude towards the imaging device 39. A tightening force is exerted on the second bent portion 45 as the screw 34 passed through the screw hole 42 of the base plate 35 is tightened and pushes the first bent portion 43 of the base plate 35 against the second bent portion 45 of the second bent portion 45 while the base plate 35 and the bracket 31 are stacked upon one another.

A spring 32 is supported by a support projection 47, formed below the coupling pin 36a of the bracket 31 and applies an elastic force to the base plate 35 while the bracket 31 is coupled to the base plate 35.

The screw 34 tightens (pushes) the second bent portion 45 of the bracket 31 away from or close to the first bent portion 43 of the base plate 35 through the screw aperture 42 formed in the first bent portion 43 of the base plate 35 to apply the tightening force to the second bent portion 45.

The imaging device 39 may be a display device, such as a liquid crystal display (LCD) device, a liquid crystal on silicon (LCOS) device, a ferroelectric liquid crystal display (FLCD) device, etc.

In the optical device fine-adjusting apparatus, the bracket 31 is fixed to the imaging device 39, and then the base plate 35, on which the optical device 33 is mounted, is coupled to the bracket 31. Then, the orientation of the optical device 33 is finely adjusted by the screw 34. After the fine adjustment of the orientation of the optical device 33 is completed, a bonding agent is applied to a contact portion between the screw 34 and the screw aperture 42 to prevent the screw 34 from being loosened. As a result, a displacement of the optical device 34 by the elastic force of the spring 32 or the tightening force of the screw 34, after the fine adjustment of the orientation of the optical device 34 is completed can be prevented, and thus the optical device 33 is stably positioned.

In the optical device fine-adjusting apparatus, the orientation of the optical device 33 is fined-adjusted and fixed such that the tightening force of the screw 34 and the elastic force of the spring 32 are in equilibrium.

Figure 4A:
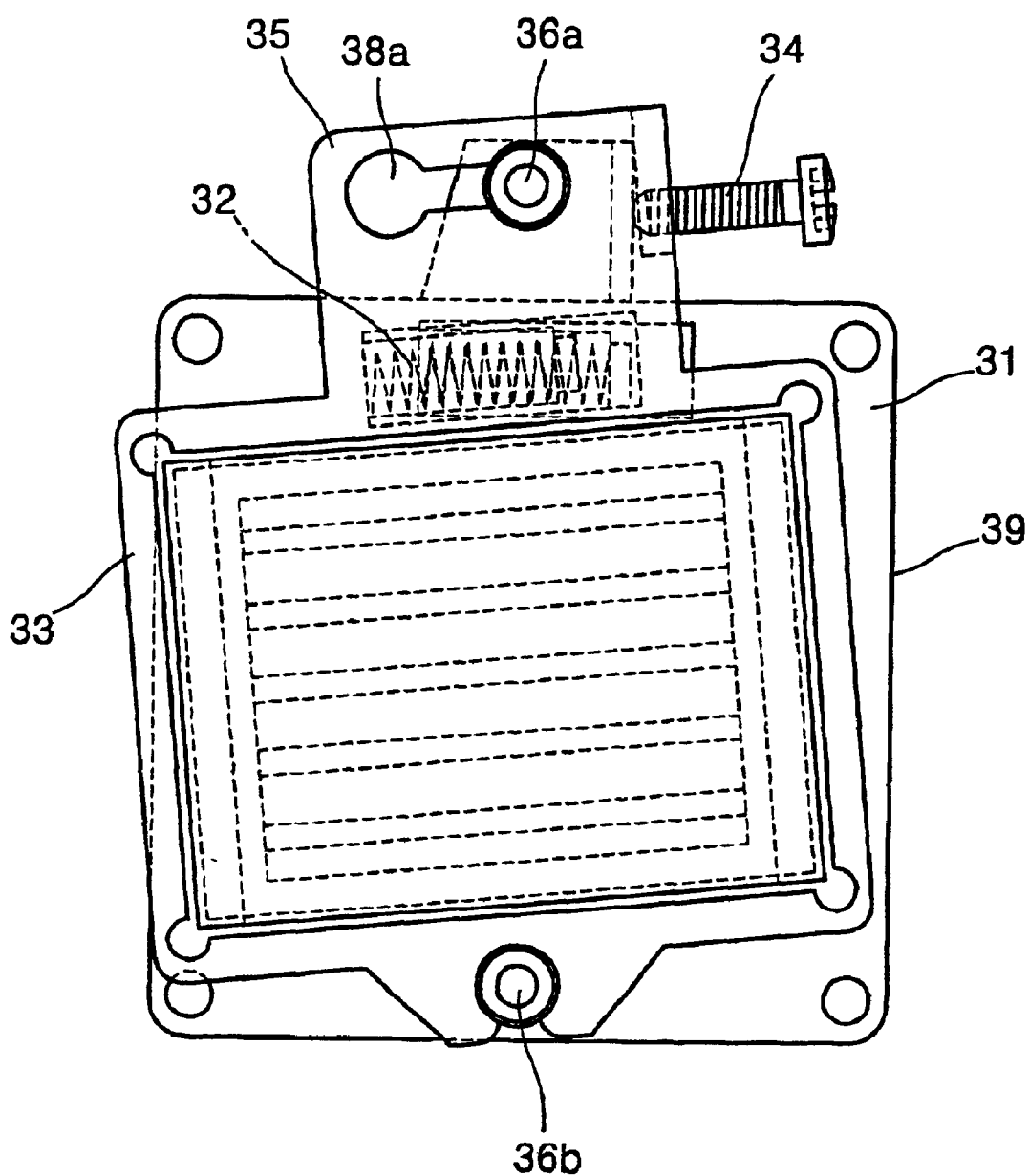
FIGS. 4A and 4B are plan views of the optical device fine-adjusting apparatus of FIG. 3.
Figure 4B:
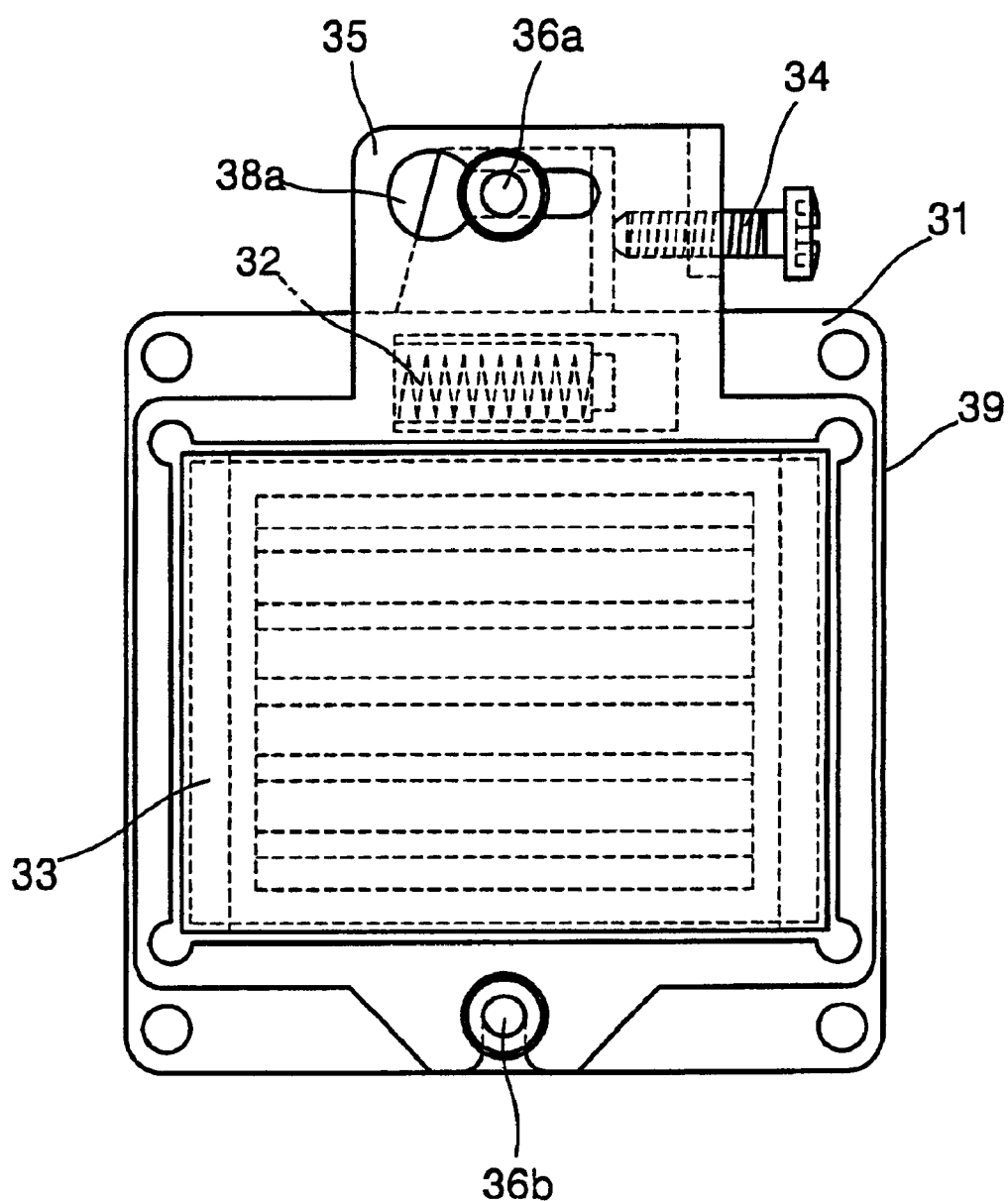

FIGS. 4A and 4B are plan views illustrating a principle of an operation of the optical device fine-adjusting apparatus according to the embodiment of the present invention. When the optical device fine-adjusting apparatus is assembled, the base plate 35 is initially tilted to the left with respect to the bracket 31, as shown in FIG. 4A. This is because the elastic force of the spring 32 disposed between the base plate 35 and the bracket 31 and supported by the support projection 47 formed in the bracket 31 is applied to the base plate 35 against the support projection 47 which faces the base plate 35.

To finely adjust the orientation of the optical device 33, the screw 34 is inserted into the screw aperture 42 of the base plate 35 and tightened so that the tightening force is applied to the bracket 31 and thus the base plate 35 gradually rotates to the right. A tilt displacement (l) of the optical device 33 is given by formula (1) below:

$$\text{tilt displacement } (l) = \text{pitch } (p) \times \frac{\text{angle of rotation}(d)}{360°} \quad (1)$$

In formula (1) above, "pitch" means the displacement of the screw 34 resulting from one full rotation of the screw 34, and "d" means a rotation angle of the screw 34. The rotation angle (θ) of the optical device 33 can be calculated from the tilt displacement (l) and a distance (s) between the two coupling pins 36a and 36b using formula (2) below:

$$\tan\theta = \frac{l}{s} \quad (2)$$

The rotation angle of the optical device is proportional to the tilt displacement, and the tilt displacement of the optical device is proportional to the pitch. Therefore, there is a need to use a screw having an appropriate pitch to properly adjust the rotation angle of the optical device.

In the optical device fine-adjusting apparatus according to the embodiment of the present invention, the orientation of an optical device can be easily and accurately adjusted by the elastic force of the spring and the tightening force of the adjusting element.

While the present invention has been particularly shown and described with reference to this embodiment thereof, the embodiment described is for exemplary purpose only and not to limit the scope of the present invention. It will be appreciated by those skilled in the art that the positions of the spring, coupling slots, and coupling pins can be varied to construct an optical device orientation fine-adjusting apparatus according to the present invention. The spirit and scope of the invention are as defined by the appended claims, not by the embodiment described above.

As described above, the optical device orientation fine-adjusting apparatus according to the present invention can easily and accurately adjust the orientation of an optical device and can easily fix the position of the optical device after the orientation adjustment, thereby improving the overall performance of a system employing the optical device.

Although a few preferred embodiments of the present invention have been shown and described, it would be appreciated by those skilled in the art that changes may be made in this embodiment without departing from the principles and spirit of the invention, the scope of wich is defined in the claims and their equivalents.

What is claimed is:

1. A precise orientation adjusting apparatus for finely adjusting an orientation of an optical device movably coupled to an imaging device, the apparatus comprising:
   a base plate supporting the optical device;
   a bracket fixedly mounted on the imaging device and coupled to the base plate such that the base plate is rotatable with respect to the bracket;
   a spring disposed between the base plate and the bracket to apply an elastic force to the base plate; and
   an adjusting element disposed between the base plate and the bracket to apply a tightening force opposite to the elastic force of the spring to the base plate through the bracket to adjust a relative position of the optical device with respect to the bracket.

2. The precise orientation adjusting apparatus of claim 1, wherein the base plate comprises coupling slots formed on opposite ends with respect to the optical device, and one of the coupling slots extends in a direction to allow the base plate to rotate along the one of the coupling slots with respect to the bracket.

3. The precise orientation adjusting apparatus of claim 2, wherein the bracket comprises coupling pins at opposite ends corresponding to respective coupling slots, and the base plate rotates about one of the coupling pins while the coupling pins engage the corresponding coupling slots.

4. The precise orientation adjusting apparatus of claim 3, wherein the bracket comprises:
   a support projection supporting the spring between the base plate and the bracket.

5. The precise orientation adjusting apparatus of claim 4, wherein the adjusting element is a screw.

6. The precise orientation adjusting apparatus of claim 1, wherein the base plate comprises a screw aperture formed on one side to be engaged with the adjusting element.

7. The precise orientation adjusting apparatus of claim 6, wherein the bracket comprises a support projection supporting the spring.

8. The precise orientation adjusting apparatus of claim 7, wherein the adjusting element is a screw.

9. The precise orientation adjusting apparatus of claim 1, wherein the bracket comprises:
   a support projection supporting the spring between the base plate and the bracket.

10. The precise orientation adjusting apparatus of claim 9, wherein the adjusting element is a screw.

11. The precise orientation adjusting apparatus of claim 1, wherein the adjusting element is a screw.

12. An apparatus for adjusting an orientation of an optical device with respect to an imaging device, comprising:
    a base plate fixedly mounted with the optical device and having at least one slot; and
    a bracket fixedly mounted on the imaging device, having at least one pin protruding toward the base plate to be movably inserted into the slot of the base plate when the base plate is movably mounted on the bracket, and having an opening through which the optical device communicates with the imaging device, the base plate rotating with respect to the bracket when the pin of the bracket moves along the slot.

13. The apparatus of claim 12, wherein the base plate comprises an additional slot, and the bracket comprises an additional pin protruding toward the base plate to be inserted into the additional slot to allow the base plate to rotate about the additional pin of the bracket when the pin of the bracket moves within the slot.

14. The apparatus of claim 13, wherein the slot of the base plate is formed in a rotational direction of the base plate so that the base plate rotates about the additional pin, and the additional slot is formed in a radial direction of the base plate.

15. The apparatus of claim 13, wherein the slot and the additional slot are disposed at opposite sides of the base plate with respect to the optical device, and the pin and the additional pin are disposed at opposite sides of the bracket to correspond to the slot and the additional slot, respectively.

16. The apparatus of claim 15, wherein the additional slot is narrowed from an edge of said base plate toward an inside of said base plate to receive the additional pin as a hinge of said base plate.

17. The apparatus of claim 12, wherein the slot of the base plate is formed in a rotational direction of the base plate.

18. The apparatus of claim 12, further comprising an elastic member disposed between the base plate and the bracket to generate an elastic force to move the base plate with respect to the bracket in a first direction.

19. The apparatus of claim 18, wherein the bracket comprises a support projection coupled to one end of the elastic member to support the elastic member between the base plate and the bracket.

20. The apparatus of claim 18, further comprising an adjusting element disposed between the base plate and the bracket to generate a tightening force to control the base plate to move with respect to the bracket in a second direction opposite to the first direction.

21. The apparatus of claim 20, wherein the base plate comprises a first bent portion protruding toward the bracket and having a hole formed on the first bent portion, and the bracket comprises a second bent portion corresponding to the first bent portion, the adjusting element being coupled to the second bent portion through the hole of the first bent portion to move the base plate with respect to the bracket in the rotational direction.

22. The apparatus of claim 21, wherein the first bent portion and the second bent portion are formed in a direction perpendicular to the rotational direction of the base plate.

23. The apparatus of claim 21, wherein the adjusting element is coupled to the second bent portion in the rotational direction of the base plate.

24. The apparatus of claim 12, further comprising a screw disposed between the base plate and the bracket to control a position of the base plate with respect to the bracket, the base plate being moved when the screw rotates.

25. The apparatus of claim 24, wherein the screw comprises a center line parallel to the base plate and the bracket.

26. The apparatus of claim 24, wherein the base plate moves by a distance obtained by multiplying a pitch of the screw by a ratio of a rotation angle of the screw and 360 degrees.

27. The apparatus of claim 26, wherein the bracket comprises an additional pin coupled to the base plate and spaced-apart from the pin, and the base plate rotates with respect to the additional pin by an angle defined by a tangential value of the distance and a second distance between the pin and the additional pin.

28. An apparatus for adjusting an orientation of an optical device with respect to an imaging device, comprising:
   a bracket fixedly mounted on the imaging device;
   a base plate fixedly coupled to the optical device and rotatably coupled to the bracket; and
   a spring disposed between the base plate and the bracket to apply an elastic force to control a position of the base plate rotating with respect to the bracket.

29. The apparatus of claim 28, further comprising an adjusting element disposed between the bracket and the base plate to generate a tightening force to push the base plate away from and closer to the bracket, wherein the base plate rotates by the elastic force and the tightening force.

30. The apparatus of claim 29, wherein the base plate is disposed in a stationary position when the elastic force of the spring and the tightening force of the adjusting element are in equilibrium.

31. The apparatus of claim 29, further comprising a bonding material applied between the base plate and the bracket when the elastic force of the spring and the tightening force of the adjusting element are in equilibrium.

32. The apparatus of claim 29, wherein the spring generates the elastic force opposite to the tightening force of the adjusting element.

33. The apparatus of claim 29, wherein the adjusting element generates the tightening force parallel to the elastic force of the spring.

34. The apparatus of claim 29, wherein the base plate comprises a plurality of slots, and the bracket comprises a plurality of pins protruding toward the base plate to be movably inserted into corresponding ones of the slots, and the base plate rotates about one of the pins.

35. The apparatus of claim 34, wherein the slots are disposed on opposite sides of the base plate with respect to the optical device, and the pins are disposed on opposite sides of the bracket to correspond to respective ones of the slots.

36. The apparatus of claim 34, wherein the slots are disposed on opposite sides of the base plate with respect to the optical device mounted on the base plate, and the pins are disposed on opposite sides of the bracket to be inserted into the correspond slots.

37. The apparatus of claim 34, wherein the one of the pins functions as a hinge about which the base plate rotates.

38. The apparatus of claim 29, wherein the adjusting element comprises a screw, and the base plate moves by a distance obtained by multiplying a pitch of the screw by a ratio of a rotation angle of the screw and 360 degrees in response to the tighten force of the adjusting element.

39. The apparatus of claim 38, wherein the base plate rotates with respect to one of the pins by an angle, the tangent of the angle being a ratio of the distance and a second distance between the pins.

40. The apparatus of claim 26, wherein the base plate rotates on a plane parallel to the imaging device.

41. The apparatus of claim 26, wherein the optical device is one of $\lambda/8$, $\lambda/4$, and $\lambda/2$ wave plates and a retarder.

42. The apparatus of claim 26, wherein the imaging device is one of a liquid crystal display device, a liquid crystal on silicon device, and a ferroelectric liquid crystal display device.

* * * * *